United States Patent [19]
Matsuki et al.

[11] Patent Number: 5,630,219
[45] Date of Patent: May 13, 1997

[54] RECEPTION ELECTRIC FIELD LEVEL DETECTION CIRCUIT

[75] Inventors: Toru Matsuki; Masayuki Takahashi, both of Tokyo, Japan

[73] Assignee: NEC Corporation, Tokyo, Japan

[21] Appl. No.: 361,566

[22] Filed: Dec. 22, 1994

[30] Foreign Application Priority Data

Dec. 28, 1993 [JP] Japan .................... 5-334094

[51] Int. Cl.$^6$ .................................... H04B 17/00
[52] U.S. Cl. .................... 455/226.2; 455/336
[58] Field of Search ............... 455/67.1, 67.3, 455/214, 226.1, 226.2, 296, 297, 309, 312, 336, 337, 303, 304, 305, 306, 206, 63, 295

[56] References Cited

U.S. PATENT DOCUMENTS

| | | | |
|---|---|---|---|
| 5,390,345 | 2/1995 | Wada et al. | 455/296 |
| 5,440,582 | 8/1995 | Birchier et al. | 455/67.1 |
| 5,483,694 | 1/1996 | Bartels et al. | 455/296 |

FOREIGN PATENT DOCUMENTS 4-245820  9/1992  Japan .

*Primary Examiner*—Reinhard J. Eisenzopf
*Assistant Examiner*—Marsha D. Banks-Harold
*Attorney, Agent, or Firm*—Foley & Lardner

[57] ABSTRACT

A reception electric field level detection circuit comprises a frequency conversion circuit, an IF filter and a demodulation circuit for outputting a demodulation signal, which are connected successively to an antenna. The reception electric field level detection circuit further comprises a reception electric field detection circuit for receiving the output of the IF filter as an input thereto and detecting the reception electric field level value of the received wave, and a discrimination circuit. A carrier sent out from a mobile radio unit to a stationary radio unit is received by the antenna and inputted to the demodulation circuit and the reception electric field detection circuit by way of the frequency conversion circuit and the IF filter. The discrimination circuit discriminates a modulated portion and a non-modulated portion of the carrier inputted to the reception electric field detection circuit and controls the reception electric field detection circuit so that the reception electric field detection circuit detects a reception electric field level value from the non-modulated portion of the carrier.

3 Claims, 7 Drawing Sheets

5,630,219

RECEPTION ELECTRIC FIELD LEVEL DETECTION CIRCUIT

BACKGROUND OF THE INVENTION

1. Field of the Invention

This invention relates to a reception electric field level detection circuit for a mobile communication system which employs a time division multiplexing method in which a plurality of mobile radio units make use of a radio channel in a multiplexed condition with respect to time.

2. Description of the Prior Art

A mobile communication system is known wherein a plurality of mobile radio units send out carriers to a plurality of stationary radio units using a plurality of radio channels which use frequency bands adjacent to each other. In a mobile communication system of the type mentioned, a reception electric field level value of a carrier received by a stationary radio unit is detected to discriminate the position of the transmission side (mobile radio unit). The detection of a reception electric field level value is performed by a reception electric field level detection circuit provided in each stationary radio unit.

FIG. 1 is a block diagram showing a conventional reception electric field level detection circuit for a mobile communication system which employs the time division multiplexing method.

The conventional reception electric field level detection circuit shown includes frequency conversion circuit 11, IF filter 12 and demodulation circuit 13 for outputting a demodulation signal, which are successively connected to antenna 17, and reception electric field detection circuit 14 for receiving the output of IF filter 12 and detecting the reception electric field level value of the received radio wave. It is to be noted that IF filter 12 has a flat characteristic within its reception band.

Frequency conversion circuit 11 receives a RF signal from antenna 17 as an input thereto and outputs an IF signal to IF filter 12. IF filter 12 has a frequency selection property of passing the band of a desired wave freely therethrough but attenuating any other band than that of the desired wave by a great amount in accordance with an attenuation factor curve, and passes a signal of a predetermined region therethrough. Demodulation circuit 13 and reception electric field detection circuit 14 receive the output of IF filter 12 as inputs thereto and output a demodulation signal and a reception electric field level value, respectively, in response to the thus inputted signal.

Next, detection of a reception electric field level value from a RF signal including an adjacent channel wave by the reception electric field level detection circuit described above is described.

FIG. 2(a) is a graph showing the RF signal including an adjacent channel wave and the band of IF filter 12 and indicates that the electric field level of the adjacent channel wave is higher than the electric field level of the desired wave. Meanwhile, FIG. 2(b) is a graph showing the output of IF filter 12 in FIG. 2(a) and indicates that, similarly to FIG. 2(a), the electric field level of the adjacent channel wave is higher than the electric field level of the desired level.

In the reception electric field level detection circuit shown in FIG. 1, when the RF signal shown in FIG. 2(a) is inputted from antenna 17 to frequency conversion circuit 11, the IF signal shown in FIG. 2(b) is outputted from IF filter 12. The thus outputted IF signal is inputted to demodulation circuit 13 and reception electric field detection circuit 14.

In the case described above, the IF signal inputted to reception electric field detection circuit 14 exhibits an electric field level value higher at the adjacent channel wave than at the desired wave as seen from FIG. 2(b). Therefore, reception electric field detection circuit 14 detects the electric field level value of the adjacent channel wave as a reception electric field level value of the IF signal. Accordingly, the conventional reception electric field level detection circuit described above cannot detect the position of the transmission side (mobile radio unit) accurately.

Thus, another reception electric field level detection circuit has been proposed wherein an additional IF filter is provided in the input line to the reception electric field detection circuit 14 in order to completely remove an adjacent channel wave from an IF signal inputted to the reception electric field detection circuit 14.

FIG. 3 is a block diagram showing the conventional reception electric field level detection circuit which completely removes an adjacent channel wave.

The reception electric field level detection circuit shown in FIG. 3 is similar to the reception electric field level detection circuit of FIG. 1 except that IF filter 16 is provided in the line branched from the output of IF filter 12 and connected to the input of reception electric field detection circuit 14. It is to be noted that, since IF filter 16 has a flat characteristic within its reception band and since the output of IF filter 16 is not used as an input signal to demodulation circuit 13, the bandwidth of IF filter 16 is restricted narrow so as to completely remove an adjacent channel wave.

Operation of the reception electric field detection circuit when it receives a RF signal including an adjacent channel wave is described below.

FIG. 4(a) is a graph showing the IF signal outputted from IF filter 12 and the band of IF filter 16 and indicates that the electric field level of the adjacent channel wave is higher than the electric field level of the desired wave. Meanwhile, FIG. 4(b) is a graph showing the output of IF filter 16 in FIG. 4(a) and indicates that the adjacent channel wave of FIG. 4(a) is removed completely and also the band of the desired wave is partially removed.

In the reception electric field level detection circuit shown in FIG. 3, when a RF signal shown in FIG. 2(a) is inputted from antenna 17 to frequency conversion circuit 11, an IF signal shown in FIG. 4(a) is outputted from IF filter 12 similarly as in the reception electric field level detection circuit shown in FIG. 1. The thus outputted IF signal is branched and is inputted, on one hand, to demodulation circuit 13 and, on the other hand, to IF filter 16.

Demodulation circuit 13 demodulates the thus inputted IF signal and outputs a demodulation signal. Meanwhile, IF filter 16 completely removes the adjacent channel wave from the inputted IF signal and outputs the IF signal shown in FIG. 4(b) to reception electric field detection circuit 14. As a result, only the reception electric field level value of the desired wave is detected by reception electric field detection circuit 14.

Since the reception electric field level value of the desired wave is detected by reception electric field detection circuit 14 in the manner described above, the position of the transmission side (mobile radio unit) can be determined accurately.

However, the conventional reception electric field level detection circuits described above have the following problems.

Of the conventional reception electric field level detection circuits, the reception electric field level detection circuit shown in FIG. 1, which includes an IF filter disposed at a stage, has a problem in that it cannot detect the electric field level of an object channel accurately and cannot discriminate the position of the transmission side (mobile radio unit) accurately.

The reception electric field level detection circuit shown in FIG. 3, which includes IF filters disposed at two stages, includes the additional IF filter inserted in the input line to the reception electric field detection circuit, and accordingly, is required to provide a matching circuit, a buffer amplifier and so forth on the front side and the rear of the additional IF filter. Consequently, the reception electric field level detection circuit has a problem in that the circuit scale is increased and the circuit becomes expensive.

SUMMARY OF THE INVENTION

It is an object of the present invention to provide a reception electric field level detection circuit which eliminates the problems described above and can detect the reception electric field level value of a desired wave with a simple circuit construction without provision of an additional IF filter.

The object of the present invention can be attained by a reception electric field level detection circuit for a mobile communication system wherein a plurality of mobile radio units send out individual carriers to a plurality of stationary radio units using a plurality of radio channels which are adjacent to each other, comprising, reception electric field detection means provided in each of the plurality of stationary radio units for detecting a reception electric field level value of any of the carriers, and control means connected to the reception electric field detection means for controlling the detection of a reception electric field level value by the reception electric field detection means, the control means being operable to discriminate a modulated portion and a non-modulated portion of the carrier and control the reception electric field detection means so that the reception electric field detection means detects a reception electric field level value from the non-modulated portion of the carrier.

The control means can discriminate a modulated portion and a non-modulated portion of a carrier received by the stationary radio unit from a frame timing set in advance to the stationary radio unit.

With the reception electric field level detection circuit of the construction described above, a carrier received by the stationary radio unit is discriminated into a modulated portion and a non-modulated portion by the discrimination means. Further, the reception electric field detection means is controlled by the control means to detect a reception electric field level from the non-modulated portion of the thus discriminated carrier.

Since a carrier of an adjacent channel is completely removed from the carrier of the non-modulated portion by the IF filter, the position of the object mobile radio unit can be discriminated accurately.

It is to be noted that the discrimination between a modulated portion and a non-modulated portion by the control means is based on a frame timing of the stationary radio unit, since transmissions from a plurality of mobile radio units are synchronized with a frame timing of the stationary radio unit side.

As described above, where the reception electric field level detection circuit of the present invention is employed, there is an effect in that, since an adjacent channel wave can be removed with a simple circuit construction, reduction in scale of the circuitry and reduction in cost can be achieved.

Also there is another effect in that, since the reception electric field level value of a desired wave is detected without being disturbed by an adjacent channel wave, the position of the transmission side (mobile radio unit) can be discriminated accurately and otherwise possible degradation in service to subscribers is prevented.

The above and other objects, features, and advantages of the present invention will become apparent from the following description referring to the accompanying drawings which illustrate an example of a preferred embodiment of the present invention.

BRIEF DESCRIPTION OF THE PREFERRED EMBODIMENT

An embodiment of the present invention is described below with reference to the drawings.

Figure 5:
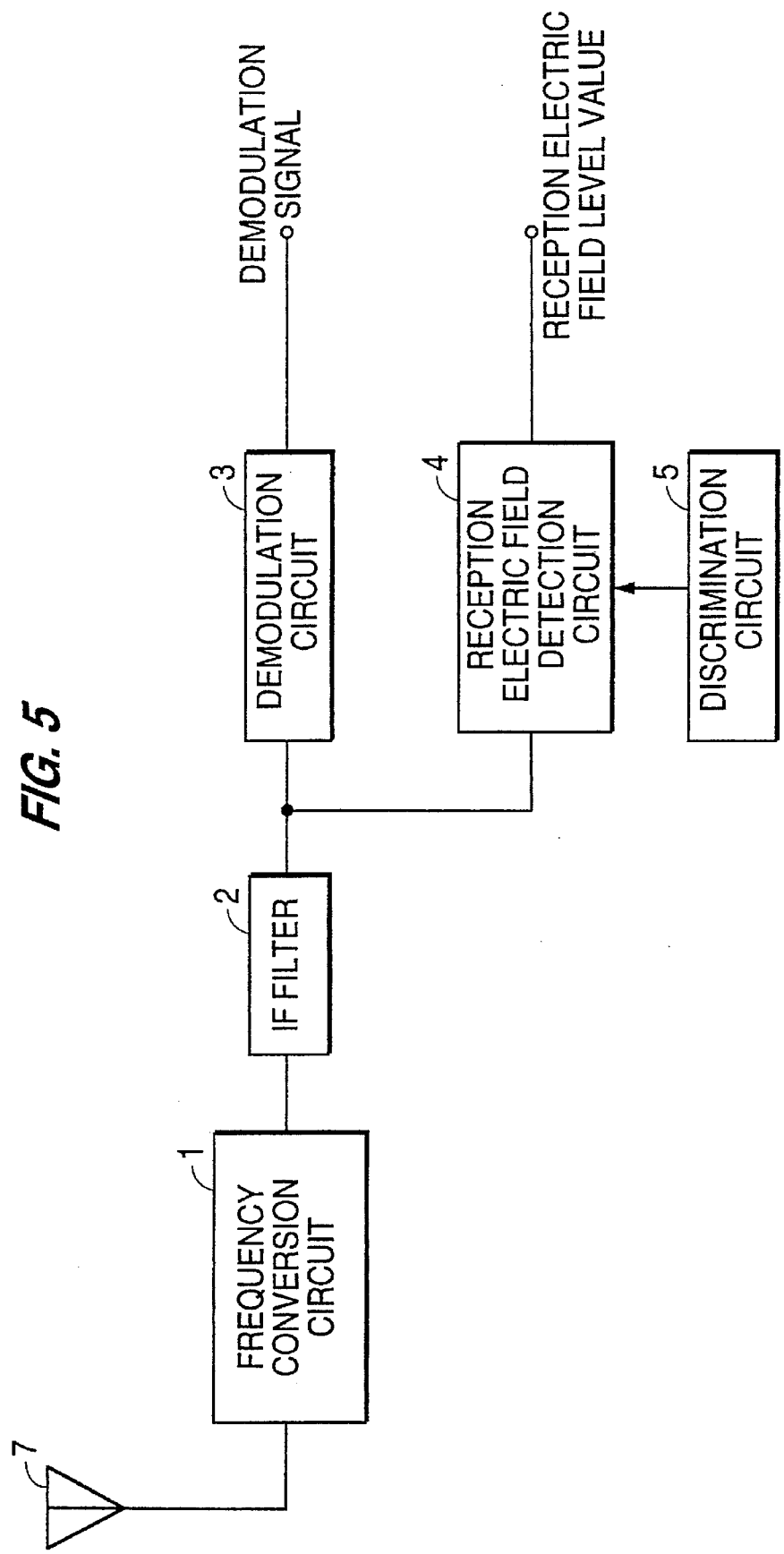
FIG. 5 is a block diagram showing a reception electric field level detection circuit of an embodiment of the present invention.

FIG. 5 is a block diagram showing a general construction of a reception electric field level detection circuit of the embodiment of the present invention.

The reception electric field level detection circuit of the present embodiment includes frequency conversion circuit 1, IF filter 2 and demodulation circuit 3 for outputting a demodulation signal, which are connected successively to antenna 7. The reception electric field level detection circuit further includes reception electric field detection circuit 4 for receiving the output of IF filter 2 as an input thereto and detecting the reception electric field level value of a reception wave, and discrimination circuit 5. It is to be noted that IF filter 2 has a flat characteristic within its reception band.

In the reception electric field level detection circuit, frequency conversion circuit 1 receives a RF signal outputted from antenna 7 as an input thereto and outputs an IF signal to IF filter 2. IF filter 2 has a frequency selection property of passing the band of a desired wave freely therethrough but attenuating any other band than that of the desired wave by a great amount in accordance with an attenuation factor curve, and passes a signal of a predetermined region therethrough. Demodulation circuit 3 and reception electric field detection circuit 4 receive the output of IF filter 2 as inputs thereto and output a demodulation signal and a reception electric field level value, respectively, of the thus inputted signal.

Discrimination circuit 5 discriminates an IF signal inputted from IF filter 2 to reception electric field detection circuit 4 into an IF signal having a non-modulated carrier and another IF signal having a modulated carrier and controls the detection of the reception electric field level value by reception electric field detection circuit 4 so that a reception electric field level value may be detected from the IF signal having a non-modulated carrier.

Operation of the reception electric field level detection circuit having the construction described above is described in detail below.

Figure 6:
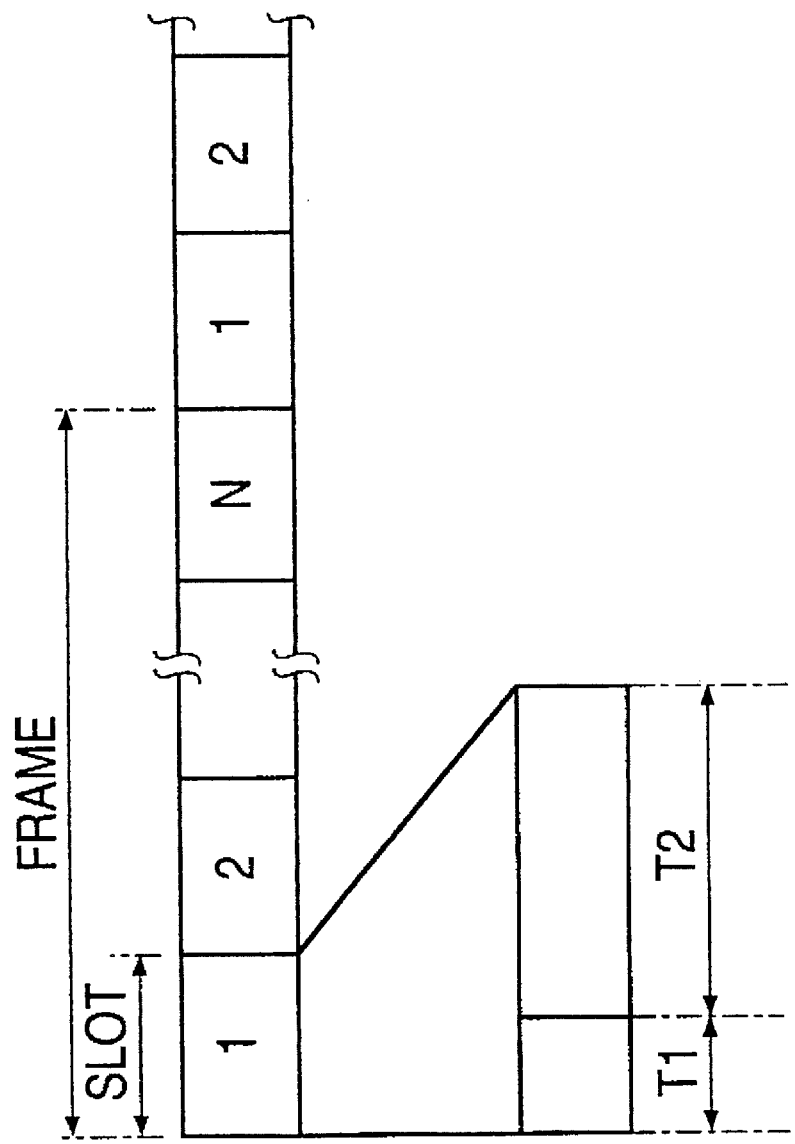
FIG. 6 is a diagrammatic view showing the construction of a frame of a carrier in a mobile communication system in which the reception electric field level detection circuit of the present embodiment is employed.

FIG. 6 is a diagrammatic view showing the construction of a frame of a carrier in a mobile communication system in which the reception electric field level detection circuit of the present embodiment is incorporated. Referring to FIG. 6, one frame is constituted from n slots each having period T1 during which a non-modulated carrier is transmitted and another period T2 during which a modulated carrier modulated in accordance with data or some other signal is transmitted.

Figure 7A:
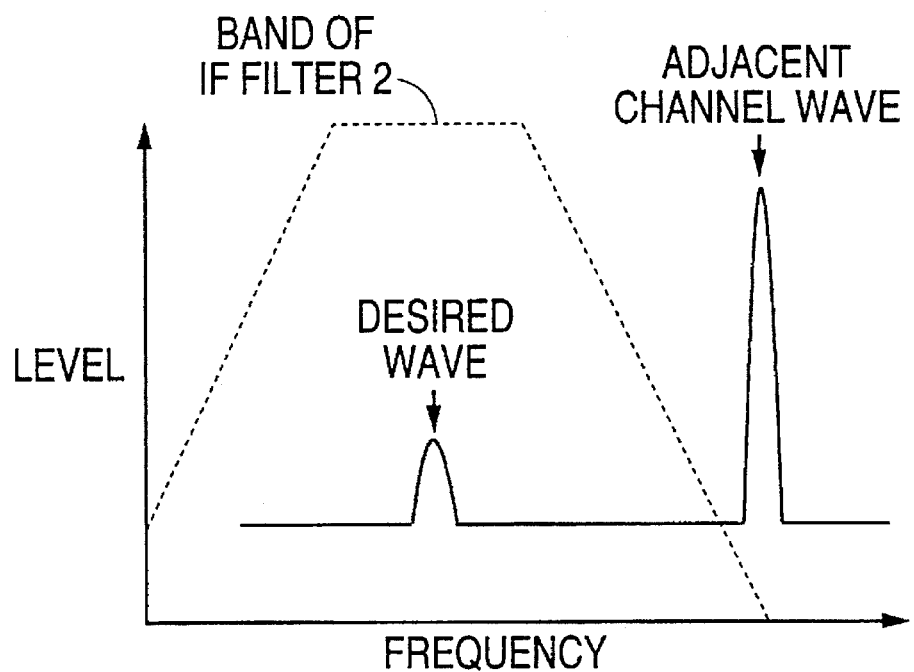
FIG. 7(a) is a graph showing a carrier of a RF signal inputted to IF filter 2 within period T1 of a particular slot of FIG. 6.
Figure 7B:
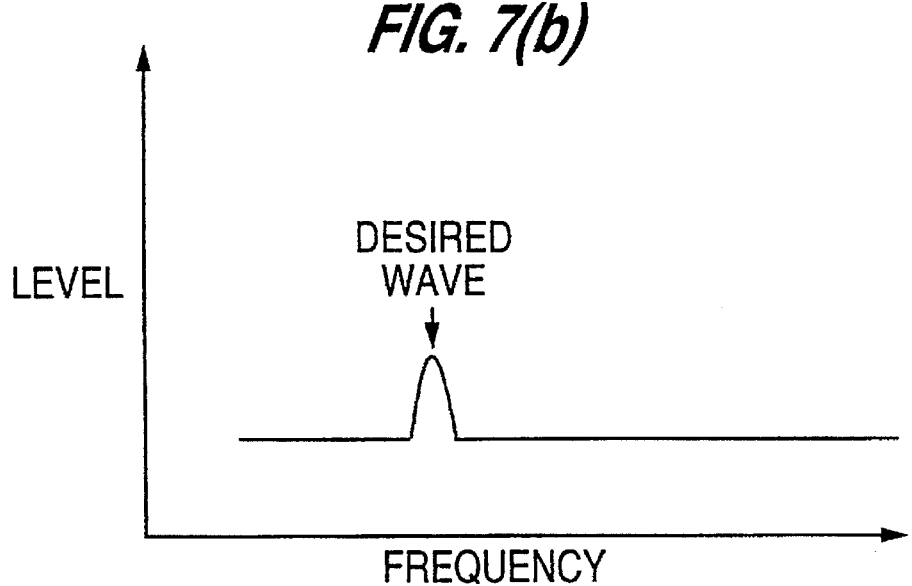
FIG. 7(b) is a graph showing a carrier of an IF signal outputted from IF filter 2 within period T1 of the particular slot of FIG. 6

Meanwhile, FIGS. 7(a) and 7(b) are graphs showing carriers within period T1 of a predetermined slot in FIG. 6. In particular, FIG. 7(a) shows a RF signal inputted to IF filter 2 and indicates that an adjacent channel wave is included in the RF signal. FIG. 7(b) shows an IF signal outputted from IF filter 2 and indicates that the adjacent channel wave has been removed completely in the IF signal.

Figure 1:
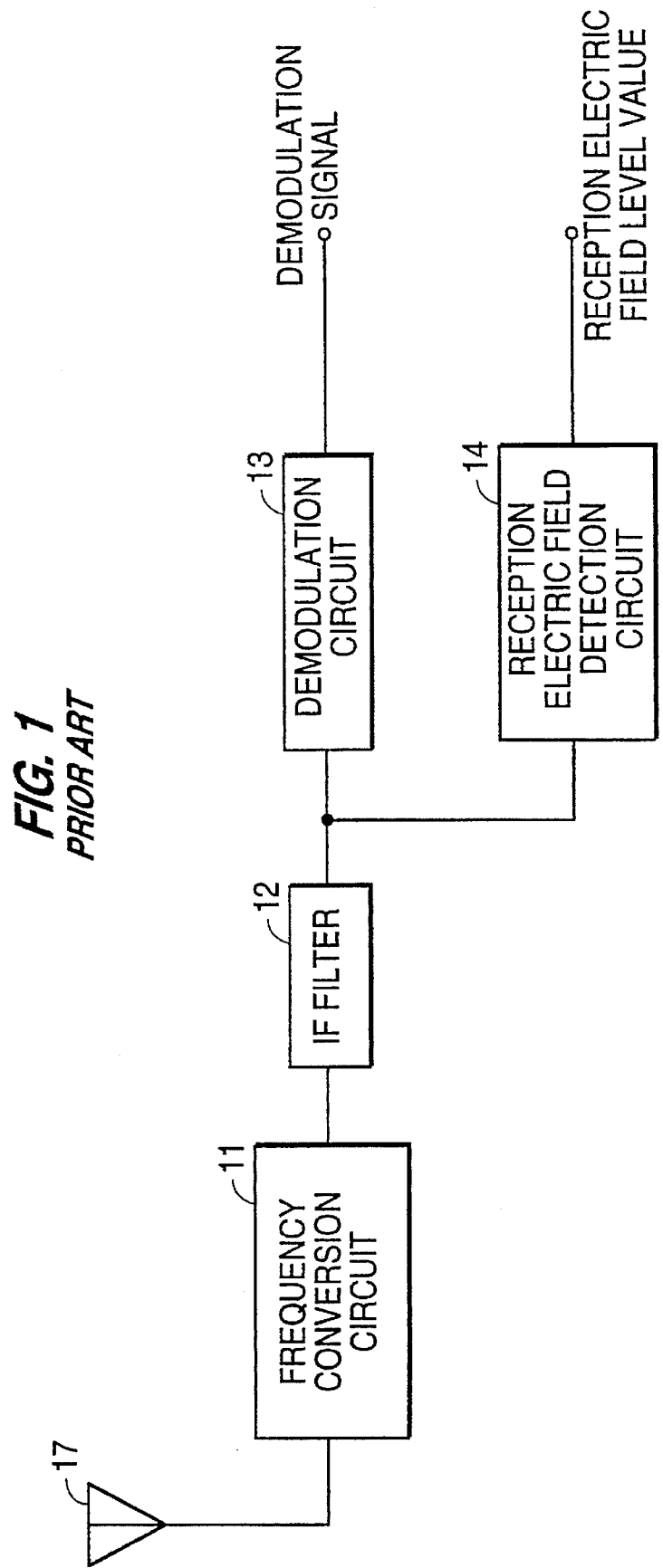
FIG. 1 is a block diagram showing a conventional reception electric field level detection circuit for a mobile communication system in which a time division multiplexing method is employed.
Figure 2A:
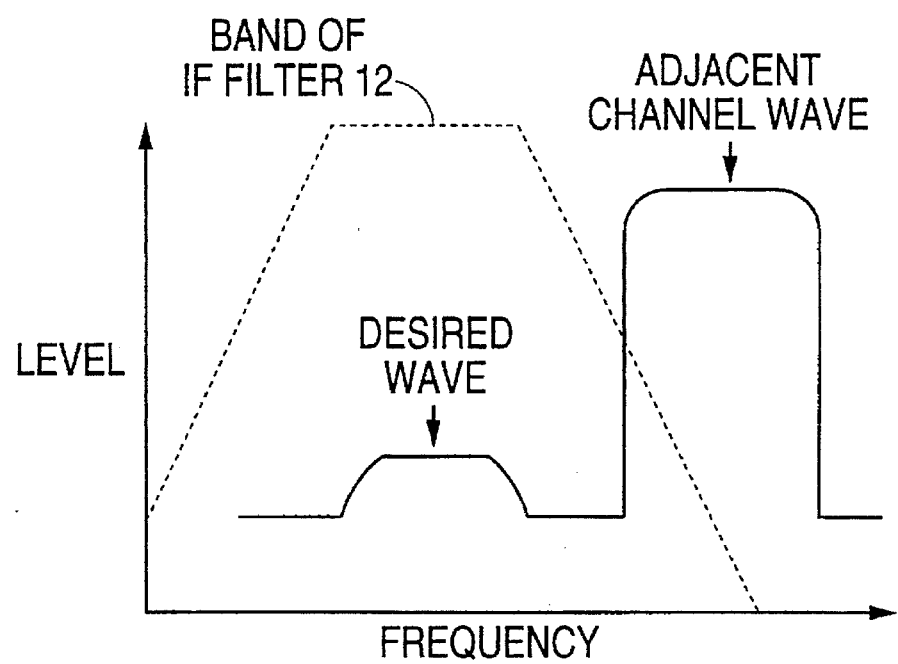
FIG. 2(a) is a graph showing a RF signal including an adjacent channel wave and the band of IF filter 12.

When the carrier shown in FIG. 6 is sent out from a mobile radio unit side to a stationary radio unit, the RF signal having a non-modulated carrier shown in FIG. 7(a) and the RF signal having a modulated carrier shown in FIG. 2(a) are inputted from antenna 7 to frequency conversion circuit 1 corresponding to periods T1 and T2, respectively.

When the RF signal is inputted from antenna 7 to frequency conversion circuit 1, an IF signal having different contents corresponding to periods T1 and T2 is outputted from frequency conversion circuit 1 to IF filter 2. Consequently, IF filter 2 outputs, in response to the RF signal inputted thereto, an IF signal having a non-modulated carrier shown in FIG. 7(b) and another IF signal having a modulated carrier shown in FIG. 2(b). In this instance, since an adjacent non-modulated carrier can be removed from the non-modulated carrier inputted during period T1 only by means of IF filter 2, the IF signal having a non-modulated carrier shown in FIG. 7(b), which is outputted from IF filter 2, includes a signal only including a desired wave.

The IF signal outputted from IF filter 2 is inputted to both of demodulation circuit 3 and reception electric field detection circuit 4.

Figure 2B:
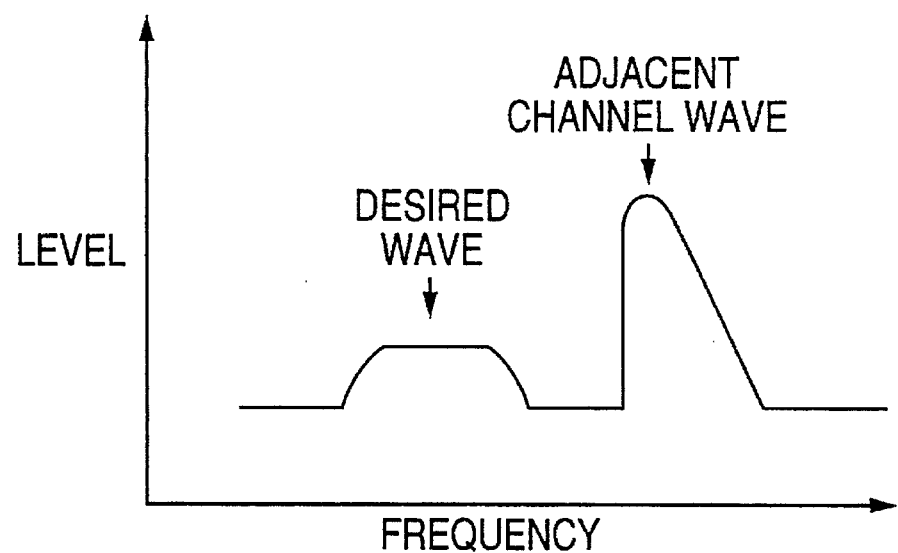
FIG. 2(b) is a graph showing the output of IF filter 12 in FIG. 2(a)
Figure 3:
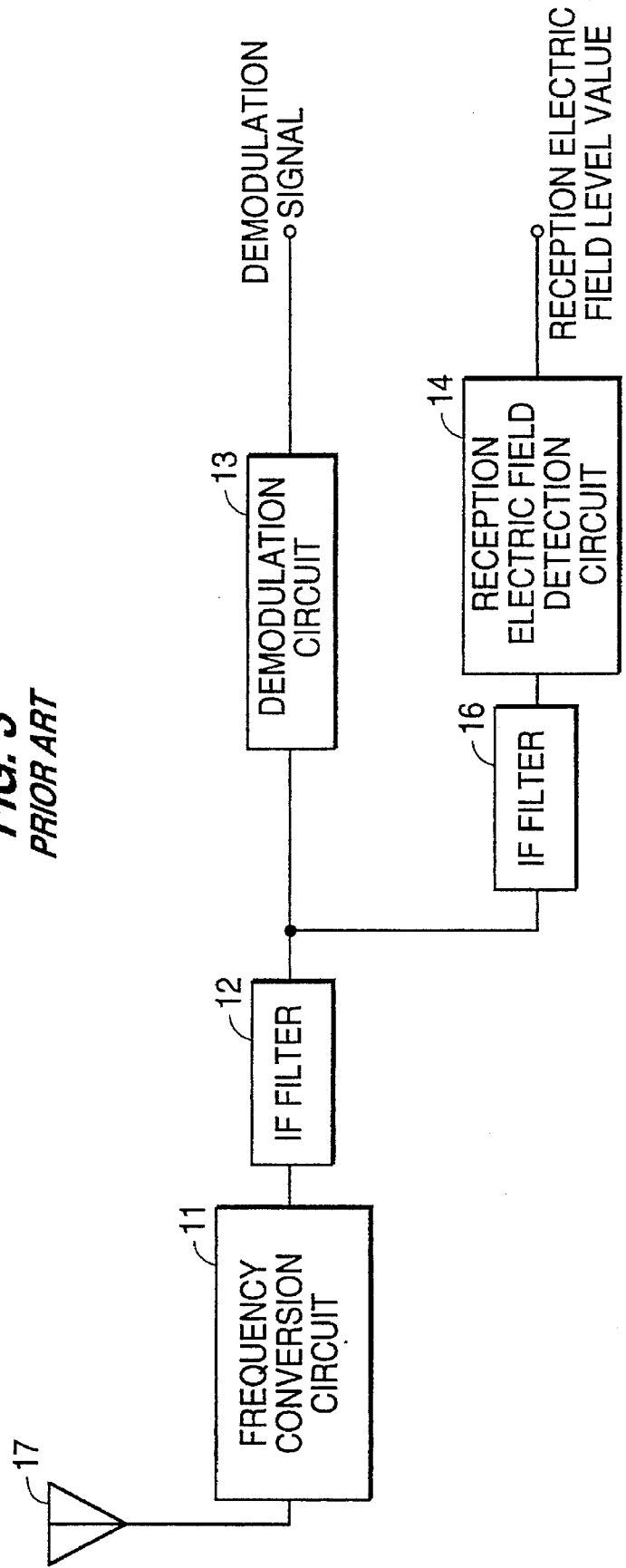
FIG. 3 is a block diagram showing another conventional reception electric field level detection circuit which completely removes an adjacent channel wave.
Figure 4A:
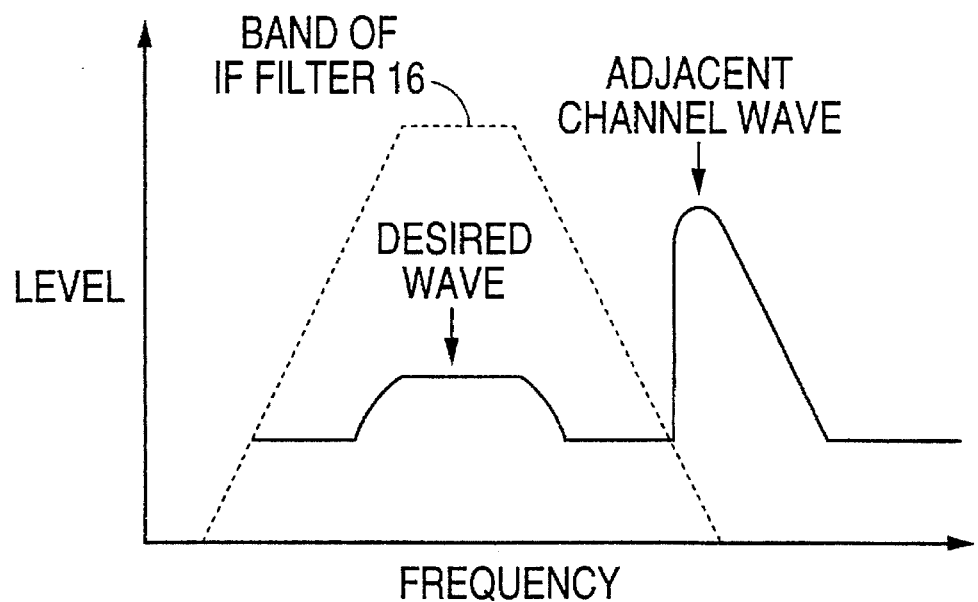
FIG. 4(a) is a graph showing an IF signal outputted from IF filter 12 and the band of IF filter 16.
Figure 4B:
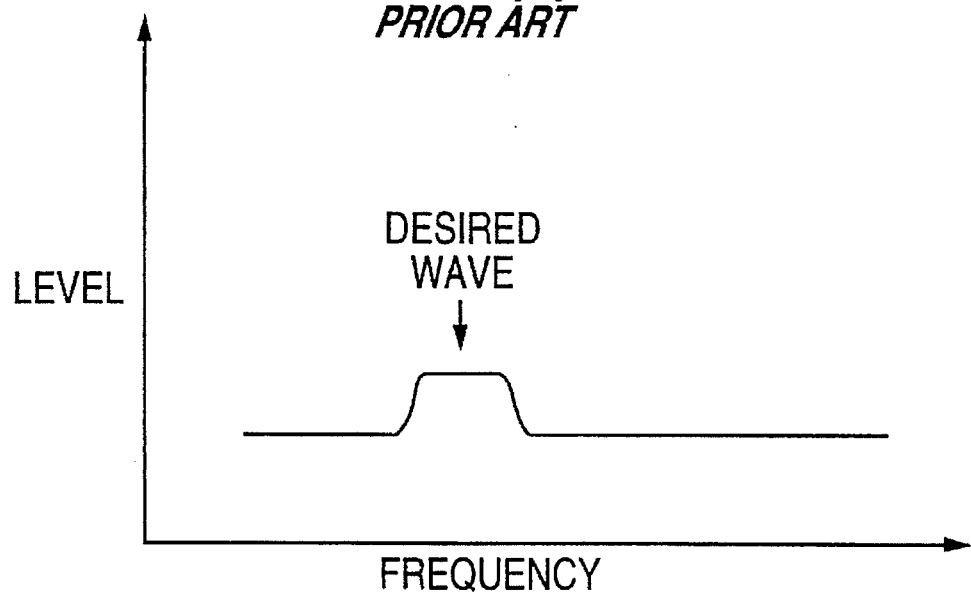
FIG. 4(b) is a graph showing the output of IF filter 16 in FIG. 4(a)

When the IF signal outputted from IF filter 2 is inputted to demodulation circuit 3, demodulation circuit 3 demodulates the IF signal of FIG. 2(b) and outputs a demodulation signal.

Meanwhile, when the IF signal outputted from IF filter 2 is inputted to reception electric field detection circuit 4, reception electric field detection circuit 4 first discriminates the IF signal inputted thereto from IF filter 2 into an IF signal of FIG. 7(b) and another IF signal of FIG. 2(b) by means of discrimination circuit 5. Thereafter, reception electric field detection circuit 4 is controlled by discrimination circuit 5 so that a reception electric field level value is detected from the IF signal of FIG. 7(b). As a result, reception electric field detection circuit 4 detects a reception electric field level value of the desired wave.

The discrimination of the IF signals of FIGS. 7(b) and 2(b) by discrimination circuit 5 described above is performed in the following manner.

Normally, in the mobile communication system described above, since transmissions from a plurality of mobile radio units are synchronized with frame timings of the stationary radio unit side, the mobile radio units have same frame timings. Similarly, the mobile radio units have same transmission periods for non-modulated carriers. Accordingly, discrimination circuit 5 performs its discrimination between a modulated carrier (period T1) and a non-modulated carrier (period T2) of a transmission wave of each of the plurality of mobile radio units in accordance with a frame timing set in advance to the stationary radio unit.

What is claimed is:

1. A reception electric field level detection circuit for a mobile communication system wherein a plurality of mobile radio units send out individual carriers to a plurality of stationary radio units using a plurality of radio channels which are adjacent to each other, comprising:

reception electric field detection means provided in each of said plurality of stationary radio units for, detecting a reception electric field level value of any of the carriers; and control means connected to said reception electric field detection means for controlling the detection of a reception electric field level value by said reception electric field detection means;

said control means being operable to discriminate a modulated portion and a non-modulated portion of the carrier and control said reception electric field detection means so that said reception electric field detection means detects a reception electric field level value from the non-modulated portion of the carrier.

2. A reception electric field level detection circuit as claimed in claim 1, wherein said control means discriminates a modulated portion and a non-modulated portion of a carrier received by the stationary radio unit from a frame timing set in advance to the stationary radio unit.

3. A reception electric field level detection circuit as claimed in claim 2, wherein one frame of the carrier includes N slots, each having a first time period during which the non-modulated portion of the carrier is transmitted and a second time period during which the modulated portion of the carrier is transmitted in accordance with a data signal.

* * * * *